US007770952B2

(12) United States Patent
Hanzel

(10) Patent No.: US 7,770,952 B2
(45) Date of Patent: Aug. 10, 2010

(54) VEHICLE TRASH MANAGEMENT APPARATUS

(75) Inventor: Andrew J. Hanzel, Washington, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 336 days.

(21) Appl. No.: 11/871,327

(22) Filed: Oct. 12, 2007

(65) Prior Publication Data

US 2009/0096240 A1    Apr. 16, 2009

(51) Int. Cl.
*B60N 3/08*    (2006.01)
(52) U.S. Cl. .................. 296/24.34; 296/37.8; 296/37.12
(58) Field of Classification Search ............... 296/24.34, 296/37.1, 37.8, 37.9, 37.11, 37.12, 37.14; 224/928, 280, 278; 131/231
See application file for complete search history.

(56) References Cited

U.S. PATENT DOCUMENTS

| 2,499,942 | A | * | 3/1950 | Boyce | 224/278 |
|---|---|---|---|---|---|
| 2,778,553 | A | * | 1/1957 | Satrom et al. | 224/483 |
| 3,084,789 | A | * | 4/1963 | Kirby | 296/37.9 |
| 3,351,069 | A | * | 11/1967 | Carper | 131/235.1 |
| 3,622,032 | A | * | 11/1971 | Tilche | 220/502 |
| 3,815,799 | A | * | 6/1974 | Trammell, Jr. | 224/275 |
| 3,888,264 | A | * | 6/1975 | Baclit | 131/235.1 |
| 5,014,874 | A | * | 5/1991 | Kitsos et al. | 220/348 |
| 7,096,780 | B1 | * | 8/2006 | Hawkins | 100/215 |
| 7,124,680 | B2 | * | 10/2006 | Poss et al. | 100/229 A |
| 7,177,725 | B2 | * | 2/2007 | Nortier et al. | 700/282 |
| 7,237,816 | B1 | * | 7/2007 | Singh et al. | 296/24.34 |
| 7,258,381 | B2 | * | 8/2007 | Sturt et al. | 296/24.34 |
| 7,264,291 | B2 | * | 9/2007 | Radu et al. | 296/24.34 |
| 7,292,911 | B2 | * | 11/2007 | Aoki et al. | 700/245 |
| 7,330,128 | B1 | * | 2/2008 | Lombardo et al. | 340/693.5 |
| 7,370,898 | B2 | * | 5/2008 | Sturt et al. | 296/24.34 |
| 7,389,630 | B2 | * | 6/2008 | Nakano | 53/553 |
| 7,413,229 | B2 | * | 8/2008 | Kukucka et al. | 296/24.34 |
| 7,416,235 | B2 | * | 8/2008 | Rajappa et al. | 296/37.8 |

(Continued)

FOREIGN PATENT DOCUMENTS

JP    05086699 U    11/1993

(Continued)

OTHER PUBLICATIONS

PCT Search Report, Apr. 10, 2009, PCT/US2008/076931, pp. 7-11.

*Primary Examiner*—Glenn Dayoan
*Assistant Examiner*—Gregory Blankenship
(74) *Attorney, Agent, or Firm*—Quinn Law Group, PLLC

(57) ABSTRACT

A trash management apparatus in a vehicle includes a recessed portion, a moveable upper drawer, and a stationary lower bin. The drawer moves in one direction within the recessed portion to direct trash into the stationary lower bin. The drawer has a through-opening allowing trash to pass into the lower bin when the drawer is moved in the one direction, with the bin being removable via an access door in an exposed lateral surface of the center console. A sensor detects a presence or level of trash within the bin or the drawer, and an indicator illuminates when a predetermined amount or level of trash is detected. An actuator is alternately connected to the upper drawer to move the drawer in the one direction when a sensor determines that trash in the drawer exceeds a threshold level.

15 Claims, 2 Drawing Sheets

U.S. PATENT DOCUMENTS

| | | | |
|---|---|---|---|
| 7,434,859 B2 * | 10/2008 | Mulvihill | 296/24.34 |
| 7,481,159 B2 * | 1/2009 | Poss et al. | 100/48 |
| 7,533,918 B2 * | 5/2009 | Spykerman et al. | 296/24.34 |
| 2006/0066118 A1 * | 3/2006 | Radu et al. | 296/37.8 |
| 2007/0024075 A1 | 2/2007 | Nakamura et al. | |

FOREIGN PATENT DOCUMENTS

| | | |
|---|---|---|
| JP | 2002104052 A | 4/2002 |
| KR | 19990042001 U | 12/1999 |

* cited by examiner

VEHICLE TRASH MANAGEMENT APPARATUS

TECHNICAL FIELD

The present invention relates to a trash management apparatus for use within a passenger compartment of a vehicle, and in particular to a vehicle trash management apparatus having a moveable upper drawer for depositing trash into a stationary lower bin which is stowable within a vehicle center console.

BACKGROUND OF THE INVENTION

Automotive passenger compartments or vehicle interiors are typically provided with one or more trash receptacles or bins offering a vehicle occupant a location that is conveniently placed for depositing miscellaneous pieces of trash, such as gum wrappers, bottle caps, and the like. In some instances, the main trash receptacle may be a centrally located ash tray, and door handle wells or cup holders having other intended purposes might also serve as additional trash receptacles. For relatively larger items of trash, such as fast food bags, beverage containers, vehicle occupants often resort to suspending a plastic bag within the vehicle compartment, for example from a glove box handle or a radio knob.

While the vehicle trash receptacles described above may be suitable for holding deposited trash, they may not provide for optimal vehicle cleanliness and appearance. For example, is using an ash tray or similarly structured trash bin device, items of trash previously deposited therein remain within the device until it is emptied, and therefore the trash remains visible to an occupant of the vehicle each time the device is opened. Also, such devices may have a low profile and limited intended purpose, for example the deposit of ashes in an ash tray. Similarly, trash deposited into an open door handle well, cup holder well, or other similarly constructed reservoir or well within the vehicle interior is always exposed and visible to a vehicle occupant, which may not be aesthetically desirable. Finally, suspended trash bags take up at least some of the available room within the passenger compartment, and likewise remain conspicuously visible to vehicle occupants.

SUMMARY OF THE INVENTION

Accordingly, an apparatus is provided for disposing of trash in a vehicle interior. The apparatus includes a recessed portion, a moveable upper drawer, and a stationary lower bin, with the drawer being moveable in one direction within the recessed portion to direct deposited trash into the lower bin, and in another direction within the recessed portion to return the drawer to its initial or ready position.

In one aspect of the invention, the recessed portion includes a stationary floor extending approximately half of a length of the recessed portion, and the drawer includes a plurality of side walls defining a through-opening. The side walls form part of a receptacle for receiving trash deposited therein when the through-opening is positioned directly above the floor, and the side walls are configured to direct the trash deposited in the receptacle into the lower bin through the through-opening when the drawer is moved in the one direction.

In another aspect of the invention, the stationary lower bin is removable to allow for emptying of trash.

In another aspect of the invention, the stationary lower bin has a finished access door adapted to conform to an exposed lateral surface of a center console of the vehicle interior.

In another aspect of the invention, the apparatus includes an indicator device and at least one sensor operatively connected to at least one of the moveable upper drawer and the stationary lower bin, and adapted to detect a predetermined amount of trash within the bin and/or drawer, with the indicator device alerting an occupant of the vehicle interior when the sensor detects the predetermined amount of trash.

In another aspect of the invention, the at least one sensor includes a level sensor for determining when a level of trash exceeds a predetermined threshold level, and is configured to activate the indicator device when the predetermined threshold level is exceeded.

In another aspect of the invention, a controller in electrical communication with an actuator is operatively connected to the moveable upper drawer, and the actuator is configured to move the drawer in the one direction when the level sensor determines that the trash is at a level exceeding the predetermined threshold level.

In another aspect of the invention, a center console for use in a vehicle interior has a moveable upper drawer with a plurality of side walls defining a through-opening, an open portion, and a recessed portion configured to receive the drawer and having a stationary floor portion. The floor portion at least partially forms a trash receptacle in conjunction with the side walls of the drawer when the through-opening is positioned directly above the floor portion, and a stationary lower bin is removable from the center console for emptying. The trash receptacle receives an amount of trash that is deposited therein, and the drawer is moveable in one direction within the recessed portion to move the through-opening above the open portion, thus allowing the trash to drop from the first receptacle into the lower bin. The moveable upper drawer is then moveable in another direction to return the drawer to a ready position for receiving another amount of trash.

In another aspect of the invention, a vehicle trash management apparatus includes a moveable upper drawer for receiving deposited trash therein when positioned at a first position, and a lower bin positioned below the drawer and contained within a cavity of a vehicle center console. The upper drawer is moveable in one direction from the first position to a second position to thereby allow the deposited trash to drop into the lower bin, and in another direction to return the upper drawer to the first position, with the lower bin being configured for removal from the cavity to permit emptying of the lower bin.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
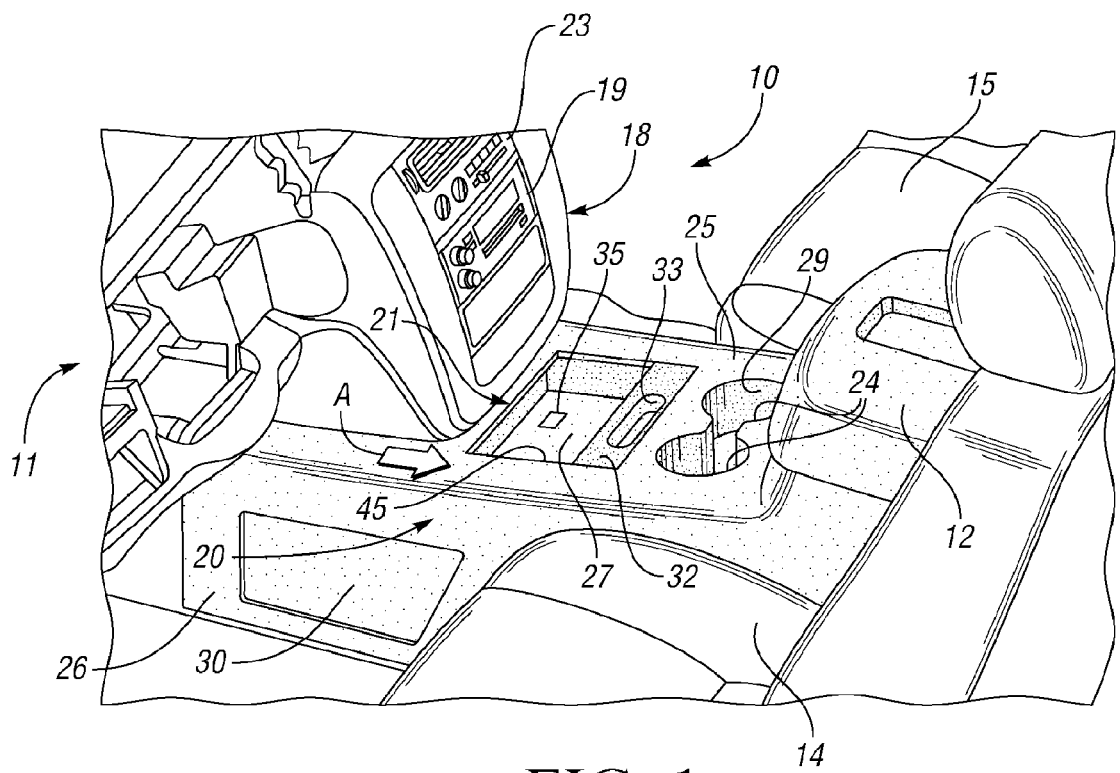
FIG. 1 is a schematic perspective side view of a vehicle interior having a center console trash management apparatus according to the invention, with the trash management apparatus in a "ready" position.

Referring to the drawings, wherein like reference numbers correspond to like or similar components throughout the several figures, there is shown in FIG. 1 a vehicle passenger compartment or vehicle interior 10 having a driver seat 14 and a passenger seat 15 separated by a center console 20. Center console 20 preferably includes an arm rest 12 usable by an occupant (not shown) of vehicle interior 10 seated in either of seats 14 or 15, and is preferably configured with a hinge mechanism (not shown) enabling arm rest 12 to open as needed for accessing a storage area or bin (not shown) suitable for stowing compact discs, change, and/or other miscellaneous items therein.

Driver seat 14 is positioned facing an instrument panel 11, which for clarity is depicted in FIG. 1 without a steering column or accompanying vehicle instrumentation. A center control unit or center stack 18 is preferably positioned adjacent to instrument panel 11 and houses or otherwise contains, for example, heating, ventilation, and air conditioning (LI-VAC) controls 23 and/or a radio/CD/MP3 player 19, and which may also house or contain other vehicle equipment (not shown) such as navigation screens, ash trays, lighters, power supplies, etc.

Center console 20 is preferably molded or constructed from a suitable grade of automotive plastic, metal, and/or composite material to include an upper surface 25 and a pair of lateral or side walls 26, with only one side wall 26, i.e. the driver-side side wall 26, being visible from the perspective shown in FIG. 1. A pair of cup holder wells 24 is preferably molded into or formed in center console 20 and accessible at upper surface 25 thereof, with each of the cup holder wells 24 being appropriately sized and/or shaped to receive a beverage container such as a soda can, water bottle, or travel mug and securely contain it therein. To that end, cup holder wells 24 are preferably coated or supplied with a layer of non-slip material 29, such as rubber or other suitable non-slip material.

In accordance with the invention, center console 20 is provided with a vehicle trash management apparatus 21, referred to hereinafter as trash apparatus 21 for simplicity. Trash apparatus 21 is configured for disposal of an item or amount of trash, represented by box 35, deposited therein in such as manner as to conceal the deposited trash (box 35) from view of an occupant (not shown) seated in vehicle interior 10, with the deposited trash (box 35) later being emptied via a conveniently located access door 30, such as shown in FIG. 1 at sidewall 26. Trash (box 35) intended for use with the invention may include any item of common vehicle trash, for example gum, food, or candy wrappers, scrap paper, or other such items of appropriate size, which would otherwise be commonly deposited into any available receptacle as described above, such as cup holder wells 24.

Figure 2:
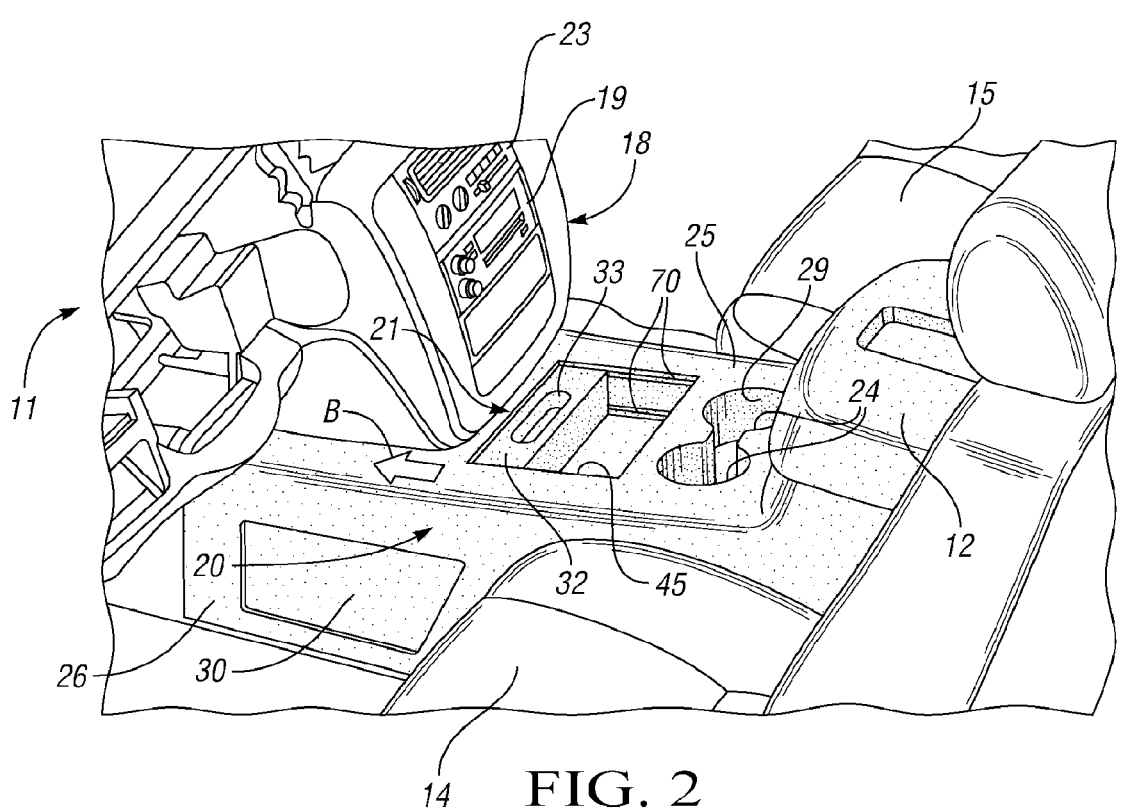
FIG. 2 is a schematic perspective view of the trash management apparatus shown in FIG. 1, with the trash management apparatus in an "emptied" position.

As shown in FIG. 1, trash apparatus 21 preferably includes a handle portion 32 having a handhold or opening 33, handle portion 32 being positioned in a fully retracted or "ready" position, i.e. to the extent of its range of motion in the direction of arrow A. In the "ready" position, trash apparatus 21 forms a trash receptacle as shown that is positioned to receive an item or amount of trash (box 35). Referring to FIG. 2, handle portion 32 may then be manually pushed or automatically propelled in the direction of arrow B to deposit the trash (box 35 of FIG. 1) into a discreet or hidden lower bin 40 which is contained within a cavity 54 (see FIGS. 3 and 4) formed in or beneath center console 20, and which will now be described with reference to FIGS. 3 and 4.

Figure 3:
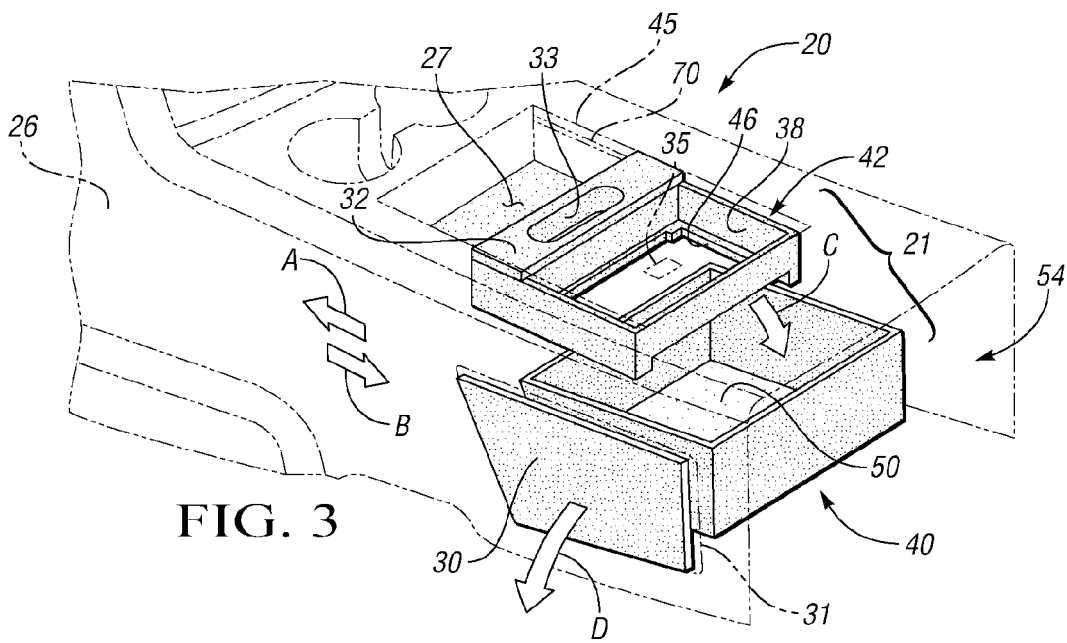
FIG. 3 is a schematic perspective side view of the center console trash management apparatus according to the invention.

Referring to FIG. 3, handle portion 32 described above is operatively connected to or formed integrally with an upper bin or drawer 42. The term "drawer" as used herein refers to a moveable or slidable box-like compartment, such as a furniture or kitchen drawer. Drawer 42 has a plurality of preferably flat inner pieces or side walls 38 defining a through-opening 46, such that drawer 42 is substantially bottomless. Recessed portion 45 of center console 20 (also see FIGS. 1 and 2) is configured to receive drawer 42 therein, and includes a stationary solid bottom portion or floor 27, as well as an open portion 28 (see FIG. 3A) positioned beneath upper surface 25 and center stack 18 (see FIGS. 1 and 2). Drawer 42 is adapted to slide, roll, or otherwise move within recessed portion 45 above floor 27, preferably via at least one track, groove, and/or slot 70.

Figure 3A:
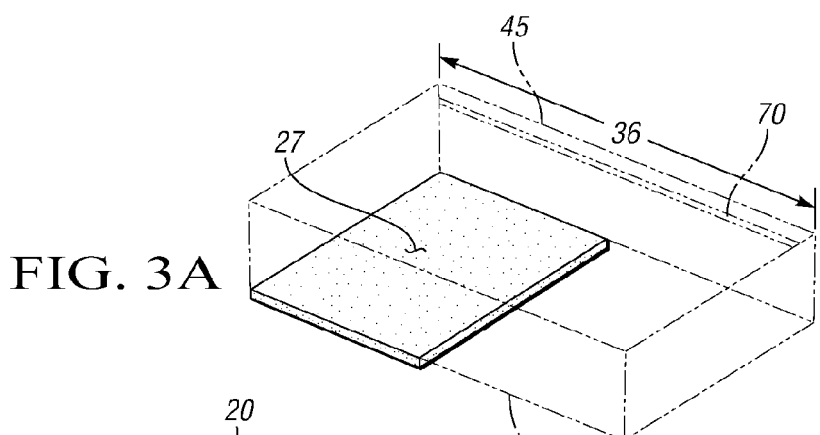

Floor 27 is sufficiently sized and/or proportioned to form a trash receptacle (see FIG. 1) in conjunction with side walls 38 when through-opening 46 is positioned adjacent to and directly above floor 27, i.e. when drawer 42 is moved into a fully retracted or "ready" position in the direction of arrow A, as shown in FIG. 1. As shown in FIG. 3A, floor 27 preferably extends only a portion of length 36 of recessed portion 45, preferably approximately half of length 36 of recessed portion 45, so that when drawer 42 is moved in the direction of arrow B toward center stack 18 (see FIGS. 1 and 2), through-opening 46 is brought into a position that is directly above open portion 28 of recessed portion 45, and no longer above floor 27. In this manner, an amount of trash (box 35) deposited onto floor 27 is swept, pushed, or otherwise directed from floor 27 by at least one of the side walls 38 of drawer 42, and allowed to drop into the concealed or hidden lower bin 40 through through-opening 46 and open portion 28 (see FIG. 3A), in the direction of arrow C.

Still referring to FIG. 3, lower bin 40 is preferably a box-like bin or receptacle having a floor 50, such that lower bin 40 is constructed to contain an amount of trash 35 therein. Lower bin 40 is continuously bonded to or otherwise securely attached to an access panel or door 30 along an interface 31. Access door 30 is preferably finished in an aesthetically pleasing manner to match or compliment the intended design of vehicle interior 10 (see FIGS. 1 and 2). Access door 30 may also be contoured, shaped, and/or formed to conform to an exposed lateral surface 26 of center console 20 so that the presence of lower bin 40 is sufficiently hidden from view. Lower bin 40 may then be extracted from cavity 54 of center console 20 in the direction of arrow D to empty any deposited trash (box 35).

Figure 4:
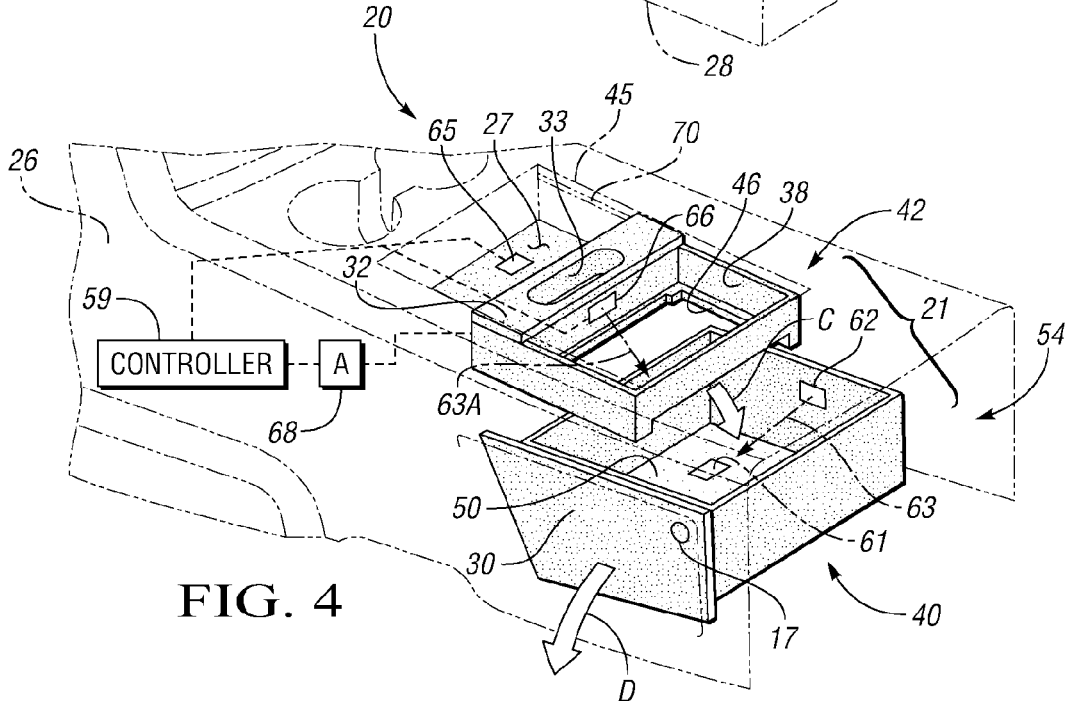
FIG. 4 is a schematic perspective side view of another embodiment of the center console trash management apparatus of the invention.

Referring to FIG. 4, another embodiment of the invention is shown having optional sensing capability and automated actuation of upper drawer 42. In the alternate embodiment, a controller 59 is provided for controlling an actuator 68 in response to a first sensor 65 and a second sensor 66, and to thereby move upper drawer 42 accordingly. First sensor 65 may be embedded within or attached to floor 27, and adapted to sense the presence of deposited trash (box 35 of FIGS. 1 and 3) by weight and/or touch, with actuator 68 being configured to move upper drawer 42 in the direction of arrow B (see FIG. 2) to achieve the position shown in FIG. 4, and to thereby deposit the trash in the direction of arrow C into lower bin 40 when the detected or measured weight exceeds a predetermined threshold value stored in controller 59.

Likewise, second sensor 66 may be embedded within or attached to an inner surface 38 of upper drawer 42, and adapted to sense the presence of deposited trash (box 35 of FIGS. 1 and 3) by proximity or level, with actuator 68 being configured to move upper drawer 42 to deposit the trash in the direction of arrow C into lower bin 40. Automatic movement of upper drawer 42 preferably occurs when second sensor 66 detects or measures a level of trash in upper drawer 42 that exceeds a predetermined threshold value stored in controller 59, with the trash (box 35) in upper drawer 42 best shown in FIG. 1. Second sensor 66 is preferably a proximity sensor capable of emitting a beam 63A, such as an infrared laser or LED beam, and then activating actuator 68 when beam 63A detects an obstacle in its path. Actuator 68 then automatically moves upper drawer 42 within recessed portion 45 in the direction of arrow B (see FIG. 2), which deposits the trash (box 35 of FIGS. 1 and 3) into lower bin 40 in the direction of arrow C, and returns to its initial position in the direction of arrow A (see FIG. 1).

Lower bin 40, as with the embodiment of FIG. 3, is stationary within cavity 54 of center console 20, and may be configured with third and fourth sensors 61 and 62, respectively, and access door 30 affixed with an illuminable indicator 17, such as an LED. Third sensor 61 is preferably substantially similar to first sensor 65 described above, i.e. a sensing device that may be embedded within or attached to floor 50 of lower bin 40, and adapted to sense the presence of deposited trash (box 35) by weight and/or touch, with third sensor 61 being configured to illuminate indicator 17 when the detected or measured weight exceeds a predetermined threshold value stored in controller 59. Likewise, fourth sensor 62 is preferably a proximity sensor capable of emitting a beam 63, such as an infrared laser or LED beam, and then illuminating indicator 17 when beam 63 detects an obstacle in its path, thus signaling to an occupant of vehicle interior 10 (see FIGS. 1 and 2) that lower bin 40 may be full.

While the best modes for carrying out the invention have been described in detail, those familiar with the art to which this invention relates will recognize various alternative designs and embodiments for practicing the invention within the scope of the appended claims.

The invention claimed is:

1. An apparatus for disposing of trash in a vehicle interior, the apparatus comprising:
   a vehicle center console having a recessed portion, said recessed portion having a floor and an open portion;
   a moveable upper drawer positioned within said recessed portion above said floor, and having side walls (38) defining a through-opening such that said drawer is bottomless, wherein said side walls form a trash receptacle in conjunction with said floor for receiving a piece of said trash deposited onto said floor; and
   a stationary lower bin;
   wherein said moveable upper drawer is moveable in one direction for directing said piece of trash deposited through said open portion of said vehicle center console and into said stationary lower bin, and moveable in another direction for returning said moveable upper drawer to a position above said floor that is suitable for receiving another piece of said trash.

2. The apparatus of claim 1, wherein said stationary lower bin is removable to allow for removal of said trash from therein.

3. The apparatus of claim 2, wherein said stationary lower bin has a finished access door that is adapted to conform to an exposed lateral surface of said vehicle center console.

4. The apparatus of claim 1, including an indicator device and at least one sensor operatively connected to at least one of said moveable upper drawer and said stationary lower bin and adapted to detect a predetermined amount of said trash within said at least one of said moveable upper drawer and said stationary lower bin, wherein said indicator device is operable for alerting an occupant of the vehicle interior when said at least one sensor detects said predetermined amount of said trash.

5. The apparatus of claim 4, wherein said at least one sensor includes a level sensor operable for determining when a level of said trash exceeds a predetermined threshold level, and is configured to activate said indicator device when said predetermined threshold level is exceeded.

6. The apparatus of claim 5, including a controller in electrical communication with an actuator that is operatively connected to said moveable upper drawer, wherein said actuator is configured to move said moveable upper drawer in said one direction when said level sensor determines that said trash is at a level exceeding said predetermined threshold level.

7. A center console for use in a vehicle interior, the center console comprising:
   a moveable upper drawer having a plurality of side walls defining a through-opening;
   a recessed portion configured to receive said moveable upper drawer, and having a stationary floor portion and an open portion, said stationary floor portion at least partially forming a trash receptacle in conjunction with said plurality of side walls when said through-opening is positioned directly above said stationary floor portion; and
   a stationary lower bin that is removable from the center console for emptying of said stationary lower bin;
   wherein said trash receptacle is configured to receive a piece of trash that is deposited therein onto said stationary floor portion, said moveable upper drawer being moveable in one direction within said recessed portion to move said through-opening directly above said open portion to allow said piece of trash to be directed from said stationary floor portion of said trash receptacle into said stationary lower bin, and wherein said moveable upper drawer is moveable in another direction for returning said moveable upper drawer to a position suitable for receiving another piece of said trash.

8. The center console of claim 7, wherein said stationary lower bin is removable from the center console to allow for removal of said piece of trash deposited therein, said stationary lower bin having a finished access door that is adapted to conform to an exposed lateral surface of the center console.

9. The center console of claim 7, including an illuminable indicator device and at least one sensor operatively connected to said stationary lower bin and adapted to detect a level of trash within said stationary lower bin, wherein said illuminable indicator device illuminates when said at least one sensor detects that said detected level of trash exceeds a predetermined level.

10. The center console of claim 7, including a controller in electrical communication with an actuator that is operatively connected to said moveable upper drawer, wherein said actuator is configured to automatically move said moveable upper drawer in said one direction from an initial position when said level sensor detects a level of trash exceeding a predetermined threshold level, and to automatically return to said moveable upper drawer to said initial position after said trash has been deposited from said trash receptacle into said stationary lower bin.

11. The center console of claim 7, wherein the center console further comprises at least one of a plurality of cup holders and an arm rest storage bin.

12. A vehicle trash management apparatus comprising:

a moveable upper drawer configured to receive trash deposited therein when positioned at a first position;

a stationary lower bin positioned below said moveable upper drawer and contained within a cavity provided within said vehicle center console, wherein said moveable upper drawer is moveable in one direction from said first position to a second position to thereby push said deposited trash such that said trash drops into said stationary lower bin, and in another direction to return said moveable upper drawer to said first position, said stationary lower bin being removable from said cavity to allow for emptying of said trash from said stationary lower bin;

a controller in electrical communication with an actuator that is operatively connected to said moveable upper drawer; and at least one sensor for detecting when an amount of said trash deposited within said moveable upper drawer exceeds a predetermined threshold;

wherein said actuator is configured to automatically move said moveable upper drawer to deposit said trash into said stationary lower bin when said at least one sensor determines that said predetermined threshold has been exceeded, and to automatically return said moveable upper drawer to said initial position after said trash has been deposited into said stationary lower bin.

13. The vehicle trash management apparatus of claim 12, wherein said stationary lower bin is operatively connected to an access panel, said access panel being shaped to conform to a lateral surface of said vehicle center console to allow access to said stationary lower bin from said lateral surface.

14. The vehicle trash management apparatus of claim 12, including an illuminable indicator device and at least one sensor operatively connected to said stationary lower bin and adapted to detect a level of said trash within said stationary lower bin, wherein said illuminable indicator device is configured to illuminate when said at least one sensor detects that said detected level of said trash exceeds a predetermined level.

15. The vehicle trash management apparatus of claim 12, wherein said at least one sensor is selected from the group of level sensor and weight sensor.

\* \* \* \* \*